Figure 1:
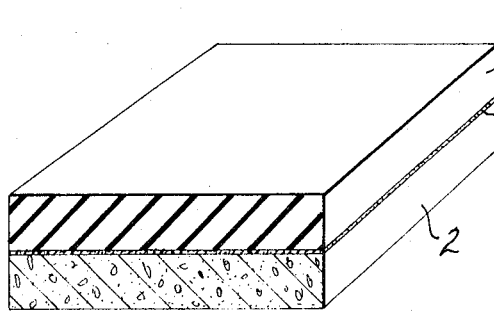

United States Patent [19]
Allen et al.

[11] 3,801,421
[45] Apr. 2, 1974

[54] RESILIENT COMPOSITE USEFUL AS SURFACING FOR ATHLETICS

[75] Inventors: Michael George Allen, Hudson, Wis.; Theodore Buchholtz, Village of Maplewood; George Van Dyke Tiers, St. Paul, both of Minn.

[73] Assignee: Minnesota Mining & Manufacturing Company, St. Paul, Minn.

[22] Filed: Nov. 9, 1970

[21] Appl. No.: 87,682

[52] U.S. Cl. ............... 161/67, 156/242, 156/331, 161/21, 161/41, 161/43, 161/62, 161/159, 161/160, 161/162, 161/190, 161/239, 161/168, 252/431, 260/2.3, 260/2.5 AC, 260/2.5 AW, 260/2.5 BE, 260/77.5 NC, 260/77.5 AB, 260/857 R, 260/858, 404/19, 404/32, 264/109

[51] Int. Cl... C08g 41/100, B32b 5/16, B32b 27/40

[58] Field of Search ....... 161/62, 67, 162, 168, 239, 161/190, 21; 264/109; 260/77.5 NC, 857 R, 859 R, 77.5 CR, 3, 2.3, 2.5 AW; 94/7, 22, 19

[56] References Cited
UNITED STATES PATENTS

| | | | |
|---|---|---|---|
| 2,947,736 | 8/1960 | Lundberg | 260/77.5 NC X |
| 3,190,841 | 6/1965 | Francis | 260/77.5 NC X |
| 3,597,297 | 8/1971 | Buchholtz et al. | 161/190 X |
| 3,644,168 | 2/1972 | Bank et al. | 161/190 X |
| 3,663,469 | 5/1972 | Weissmahn | 260/2.3 X |
| 3,272,098 | 9/1966 | Buchholtz et al. | 161/162 |
| 2,978,449 | 4/1961 | France et al. | 260/77 NC |
| 3,030,251 | 4/1962 | LaBore et al. | 161/168 |
| 2,752,277 | 6/1956 | Keen | 161/162 |
| 3,381,008 | 4/1968 | Steyermark | 260/77 NC |
| 3,487,080 | 12/1969 | Matsui et al. | 260/77 NC |
| 2,515,847 | 7/1950 | Winkler | 161/21 |

*Primary Examiner*—George F. Lesmes
*Assistant Examiner*—Charles E. Lipsey
*Attorney, Agent, or Firm*—Alexander, Sell, Steldt, & Delahunt

[57] ABSTRACT

A resilient composite material useful, for example, in the form of a layer as a surfacing or paving for athletic activities, comprising particulate vulcanized rubber bonded with polyisocyanurate resin.

14 Claims, 5 Drawing Figures

PATENTED APR 2 1974  3,801,421

INVENTORS
MICHAEL GEORGE ALLEN
THEODORE BUCHHOLTZ
GEORGE VAN DYKE TIERS
BY Kinney, Alexander,
Sell, Steldt & DeLaHunt
ATTORNEYS

RESILIENT COMPOSITE USEFUL AS SURFACING FOR ATHLETICS

This invention relates to a composite material comprising bonded particulate vulcanized rubber useful as a surfacing or paving for athletic activities. In another aspect, it relates to the method for preparing such a composite material.

Many proposals have been made over the years for using various bonded aggregate composites as surfacing or paving for athletic activities, such as running tracks, tennis courts, and football fields. Though some of these are practical (e.g., see U.S. Pat. No. 3,272,098), most of these prior art composite materials are impractical or have disadvantages. In an attempt to provide composite materials which are economical to use and have desirable properties, vulcanized rubber particles or aggregate, such as obtained as scrap by shredding or otherwise comminuting the carcass and/or tread of pneumatic automobile and truck tires, has been proposed, using as binders therefor such materials as rubber latex, rubberized asphalt, rubber-based adhesives, alkyd resins, and polyurethanes (for example, see U.S. Pat. Nos. 2,347,233, 2,678,081, 2,977,864, and 3,030,251 and German Utility Model (Gerbrauchsmuster) No. 1,993,872). These prior art binders and the composites made therefrom, however, are not satisfactory for one reason or another. For example, polyurethane binders generally have poor hydrolytic stability and can revert back or degrade to a liquid state under environmental stress, usually involving high temperature and humidity, thus destroying the structural integrity of the composite. The polyurethane reaction mixture, in the presence of the vulcanized rubber aggregate, may not cure in the desired fashion, probably because the vulcanizing agent (sulfur) or other rubber compounding chemicals in the aggregate deactivate or adversely affect the catalyst used in the reaction mixture. Also, some polyurethanes do not adhere well to the aggregate and the desirable structural integrity of the composite is not obtained or retained, the aggregate in some cases being readily dislodged during use of the composite.

Briefly, according to the invention, a shaped composite article useful, for example, in the form of a layer as a surfacing or paving for athletic activities, is provided, comprising particulate vulcanized rubber bonded with a polyisocyanurate resin. Such composite articles can be made by coating the particulate vulcanized rubber (such as scrap from the treads and/or carcass of pneumatic automobile or truck tires) with an essentially solvent-free, room temperature-curable, liquid reaction mixture comprising polyisocyanate and a trimerizing catalyst, shaping the resulting mass of coated vulcanized rubber particles to a desired configuration, and allowing the coating to cure to form a binder or matrix for the vulcanized rubber particles and provide a shaped article of composite material, the cured binder or matrix for the composite being a resin having a plurality of isocyanurate linkages. Such a composite is resilient, flexible, elastomeric, compressible and has hydrolytic stability, structural integrity, and has other physical properties making it eminently useful as a surfacing or paving for athletic activities, such as track and field events, tennis, football, and the like. The surfacing can be used for gymnasiums and field houses and for pedestrian or vehicular traffic.

In the accompanying drawing, FIG. 1 is a perspective view, in partial section, illustrating a layer of composite material of this invention on a suitable substrate; and FIGS. 2, 3, 4 and 5 are views similar to that of FIG. 1 illustrating other embodiments of this invention with the composite material overlaid with other materials to provide laminated surfacings for various purposes. In these figures, like parts are designated with like reference numbers.

The binder used to bond the vulcanized rubber particles to form the structurally integral, shaped composite article of this invention is a crosslinked polyisocyanurate polymer. This type of polymer is broadly known in the art and it is characterized by containing a plurality of isocyanurate linkages which impart thermal stability to the polymer, such linkages having the formula

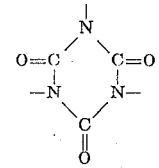

These polyisocyanurates can have crosslink densities of one crosslink per 400 to 20,000 atomic weight units of polymer, the preferred rubbery polyisocyanurates having a crosslink density of one crosslink per 1,000 to 5,000 atomic weight units. In addition to the aforementioned thermal stability, these polymers, more importantly, are hydrolytically stable and no significant change in physical properties, such as hardness, occurs in these polymers on standing or in use as a binder for the composite, even upon immersion in water or upon being subjected to high humidity and temperature environments (e.g., when tested by the procedure described in "Insulation," August, 1968, p. 39). Thus, the desired structural integrity, appearance and physical properties of the composite of this invention are maintained on standing or in use, e.g., even under relatively high humidity and temperature conditions such as 70 to 100 percent R.H. and 40° to 160° F.

The polyisocyanurate binder is prepared, in the presence of the vulcanized rubber particles, by trimerizing polyisocyanates, using for this purpose a trimerizing catalyst. As a class, the polyisocyanates are well known, and the aromatic polyisocyanates and isocyanate prepolymers are preferred in making the binders of this invention. Representative polyisocyanate compounds which can be used in this invention include such compounds as 2,4- and 2,6-tolylene diisocyanates; 1,5-naphthylene diisocyanate; 4,4'-diisocyanatophenylmethane; 3,3'-dimethyl-4,4'-biphenylene diisocyanate; 3,3'-dimethoxy-4,4'-biphenylene diisocyanate, 3,3'-diphenyl-4,4'-biphenylene diisocyanate, 4,4'-biphenylene diisocyanate, 3,3-dichloro-4,4'-biphenylene diisocyanate, and 4,4',4''-triisocyanato-triphenyl-methane. The so-called polymeric polyisocyanates can be used, such as those obtained by phosgenation of polyamines prepared by condensing formaldehyde with aromatic amines; particularly useful polymeric polyisocyanates are the polymethylene polyphenyl isocyanates, such as those sold commercially under the trademarks of Mondur MR and MRS, Isonate 901 and 390P, and PAPI. A list of useful commercially available polyisocyanates is found in "Encyclopedia of Chemical Technology," Othmer, Second Ed., p. 146–147, Interscience Pub., 1967 and in Appendix A of "Polyurethanes:Chemistry and Technology," by Saunders & Frisch, Part I, Interscience Pub. (New York, 1962). Urethane prepolymers, sometimes referred to as isocyanate-terminated prepolymers, can be used and are known (e.g., see U.S. Pat. Nos. 3,073,802 and 3,054,755), such prepolymers being prepared by reacting an aromatic or so-called polymeric polyisocyanates with a polyol such as polyoxyalkylene polyol, typically, polypropylene glycol, using an excess of the polyisocyanate. Mixtures of various polyisocyanates can be used to prepare the binders of this invention. The polyisocyanates which are preferred are those commonly used in conjunction with polyols to prepare polyurethanes, including so-called urethane prepolymers.

Where the binder used in this invention is prepared by reacting greater than stoichiometric amounts of polyisocyanate with polyol, conventional polyols used in making polyurethanes can be used. Such polyols include polyalkylene ether polyols and polyesters and polyester amides containing reactive hydroxyl groups. Broadly, the polyols can have molecular weights between 250 and 3,000 or even as high as 5,000. Where a harder binder is desired, the polyol will generally have a hydroxyl equivalent weight of 130 to 400 (i.e., one reactive hydroxyl group per 130 to 400 molecular weight of polyol). Where a softer, more rubbery binder is desired, the polyol will generally have an equivalent weight of 400 to 1,000. The polyalkylene ether polyols are polyols generally made as condensates of ethylene, propylene, or butylene oxides with pentaerythritol, sorbitol, sucrose, methylglucosides, or low molecular weight polyols, such as propylene glycol, tri-, tetra-, penta-, hexa- methylene glycols, 1,3-butylene glycol, 1,3-(2 ethyl) hexane diol, 2,2,24-trimethyl-1,3-pentanediol, trimethylol propane, 1,2,6-hexane triol, or phenyldiisopropanol-amine. Polypropylene ether polyols are particularly useful and readily commercially available (see Appendix B of Saunders & Frisch, supra).

Where the binder of this invention is made from polyisocyanate-polyol reaction mixtures, the mixtures used have NCO/OH equivalent ratios greater than 1, preferably at least about 1.2/1, and can be as high as 12/1 or greater. Typically, the NCO/OH ratio will be 1.2/1 to 6/1. Generally, the greater this ratio, the greater amount of isocyanurate linkage in the resulting product and the greater its hardness. The preferred products are those which are highly crosslinked by reason of having about 20 to 85 percent of the isocyanate groups in the reaction mixture converted to isocyanurate linkages, the rest of the isocyanate-derived linkages comprising urethane linkages or, in the event that moisture is present during polymerization, urea linkages.

The catalysts used for catalyzing the trimerization of polyisocyanates or polymerization of the aforementioned mixtures of polyisocyanates and polyols will generally be basic catalysts which promote the formation of isocyanurate rings and, where polyol is present, the formation of urethane linkages. Preferred catalysts are xanthate salts which can be represented by the general formula:

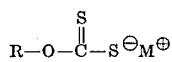

in which M⊕ is a cation such as an alkali metal cation, e.g., lithium, sodium or potassium, or a quaternary ammonium cation, e.g., tetraalkyl ammonium, R is an alkyl, which can be substituted with ether oxygen atoms and/or hydroxyl substituents, e.g., alkoxyalkyl, alkoxyalkoxyalkyl, hydroxyalkyl, and (hydroxyalkoxy) alkyl, and the like, R preferably having two to 18 carbon atoms, O is oxygen, and S is sulfur. Catalysts of this type are described in U.S. Pat. No. 3,381,008 and co-pending application Ser. No. 88,219, filed herewith, now U.S. Pat. No. 3,711,444. Representative catalysts of this type include tetra-methyl-ammonium ethyl xanthate, potassium isobutyl xanthate, sodium n-hexyl xanthate, potassium 2-methoxypropyl xanthate, sodium 1-methoxy-2-propyl xanthate, sodium 6-methyl-4,7-dioxa-2-octyl xanthate, and the like.

The amount of catalyst used in trimerizing or polymerizing the isocyanate or polyol-polyisocyanate reaction mixtures of this invention will vary, depending on the particular catalyst and reactants used. Generally, the amount of catalyst to use will be less than 10 wt. percent of the polyisocyanate reactant, and usually from 0.5 to 5 wt. percent of the polyisocyanate. Functionally stated, the amount of catalyst to use will be that amount sufficient to catalyze the trimerization polymerization of the reaction mixture at the desired temperature.

Where a more highly crosslinked polymer is desired, the polyol-diisocyanate reaction mixture can include a conventional triisocyanate or a triol. The reaction mixture can also include modifying monoisocyanate or alcohols such as 1,4-butane diol, butyl Cellosolve, butyl Carbitol, and oleyl alcohol, to impart special properties to the polymer product, such as the degree of final hardness.

Though generally the composites of this invention can be made with the binder in a non-cellular form, the binder can be made in a cellular form by incorporating water in the liquid reaction mixture used to form the binder or by incorporating blowing or foaming agents such a low molecular agents such as low molecular weight alkanes, alkenes, and halogenated alkanes disclosed, for example, in U.S. Pat. No. 3,072,582. The composites made with cellular binders will generally have greater flexibility, energy absorbing, and insulating properties than those made with non-cellular binders. Use of a cellular binder may result in an increase or decrease in the volume of interstitial space between the bonded, vulcanized rubber particles, and thus increase or decrease the density of the composite, depending on the amount of blowing agent used or foaming conditions.

The particulate vulcanized rubber can be obtained by shredding, chopping, grinding or otherwise comminuting any vulcanized natural or synthetic rubber, such as vulcanized copolymers of butadiene and styrene (known in the art as SBR rubber), 2-chloro-1,3-butadiene polymers (known in the art as neoprenes), polyisoprene, polybutadiene, copolymers of ethylene and propylene, and the like, including blends of such rubbers. Especially useful and economical sources of the rubber particles will be scrap obtained from the treads and/or carcass of automobile or truck tires, and, as such, the vulcanized rubber will contain the conventional rubber compounding chemicals, such as carbon black, sulfur, etc. The sizes of the particles can vary and they can be relatively smooth-surfaced or angular.

Preferably, the bulk of the particles will be shreds, cigar-shaped rods, or slivers, particles of such shape aiding in distributing forces applied to the composite during use. Typically, the particles will have sizes such that substantially all passes through a screen with 1/2 inch or 1/4 inch openings and is retained on a U.S. Sieve No. 30 or No. 40 screen. Generally, the larger the particles, the greater the permeability of the composite, other things, such as pressure applied during fabrication of the composite and amount of binder, remaining the same.

The relative amounts of particulate vulcanized rubber and binder in the composites can vary, but generally the particulate will amount to 50 to 95 weight percent and the binder will amount to 5 to 50 weight percent, based on the total weight of the composite. In any event, the amount of binder used will be that sufficient to partially or wholly coat the particles such that upon curing the coating, the composite will have structural integrity and can be readily handled. Where it is desirable to prevent degradation of the rubber particles (e.g., due to exposure to air) or where it is desirable to color the composite with pigments, sufficient binder will be used to wholly coat the particles. Of course, the larger the relative amount of rubber particles used in making the composite, the lower will be the raw material cost, the rubber particles being a far less expensive material than the binder. The binder and rubber particles are compatible, and the binder can tolerate large amounts of the latter, and the presence of the particles during the cure of the binder does not adversely affect the manner of cure or the nature of the cured product.

If desired, the composite material of this invention can be colored for decorative, aesthetic, or utilitarian purposes by incorporating into the binder various pigments or colorants. Use of a pigmented binder results in a colored composite in which the vulcanized rubber particles are partially or preferably wholly colored on their surfaces. Also, if desired, the binder can have fillers incorporated therein, such as clay, hollow microspheres, expanded perlite or vermiculite, asbestos, or other fibrous fillers, and the like, to modify, increase or change the physical properties of the composite.

Another advantage of the liquid reaction mixture or coating used to form the binder of this invention is that it is essentially solvent free and of low volatility, that is, it does not contain any significant amount of materials which volatilize during cure of the coating or during use of the composite article. Of course, since the coating is essentially solvent free, there will not be any significant swelling of the rubber particles, nor will the constituents of the coating cause such swelling. During curing, or thereafter, the shaped mass of composite does not perceptibly shrink or expand, and shaped composites with close dimensional tolerances can be made.

Though the composite articles of this invention can be made in a form which is substantially impervious or nonporous, for example, to air, water or moisture, it will preferably be made in a porous or permeable form for some applications, such as surfacing for athletics. Such permeable articles can be made by using vulcanized rubber particles which are irregular in shape and variable in size and/or by using an amount of binder such that the particles are coated, either partially or wholly, with sufficient void space or interstitial space left between the coated particles. This void space can amount, for example, from 15 to 75 volume percent of the composite. Such void space will be advantageous where, in the use of the composite as a surfacing, it is flooded with water, for example, rainwater, the permeable nature of the composite permitting drainage of such water. Such drainage will also minimize or prevent pressure points, due to subsurface conditions, from developing between the layer of composite and any surfacing laminated thereon. Such void space also imparts a cushion-like nature and sound absorption to the composite.

Figure 2:
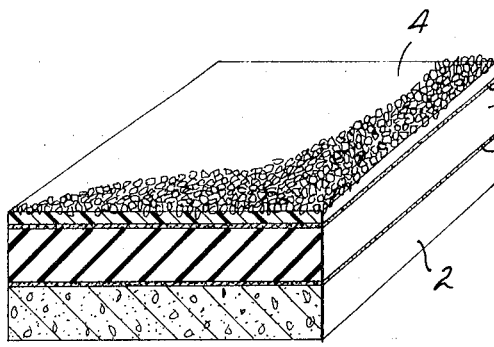

In fabricating the composite in a form useful for surfacing, the coated particulate vulcanized rubber can be poured into any suitable mold and allowed to cure, after which the cured composite can be removed from the mold, the molded article having the shape and size of the mold cavity. The composite article can vary in density, e.g., from 0.5 to 1 gram/cc., or greater, the particular density desired being obtained by applying pressure to the mass of coated particles in the mold during its cure; the greater the pressure, the greater the density of the composite article. Curing can take place at various temperatures, e.g. from 30° to 100° F., and typically room temperature, though elevated temperatures, e.g., as high as 400° F., can be used in order to hasten the cure. If desired, hot air can be forced through the permeable mass of coated particles to hasten cure. Instead of using a mold, the mass of coated particles can be continuously poured onto a desired substrate, such as a moving belt or the like, preferably troweling, tamping, or otherwise shaping it, and allowing it to cure at ambient temperature. The mass of coated particles also can be poured on a desired substrate, such as asphalt, concrete, and the like, troweled, and cured in situ. In making prefabricated composite articles useful for surfacing, the mass of coated particles can be cured in bulk and the cured bulk article then cut, sliced, skived, or otherwise divided into smaller articles of desired shape, such as boards, tiles, strips or the like, with interlocking edges or the like if desired.

Where the composite material of this invention is used as a surfacing, for example, for athletic activities, preformed shapes, such as boards or strips of the composite can be laid on a suitable substrate such as asphalt, concrete or the like, and preferably bonded thereto with a layer of a suitable adhesive such as a conventional two-part catalyst-cured polyurethane for a permanent installation or a pressure-sensitive adhesive for a temporary installation. This utility for the composite of this invention is illustrated in FIG. 1 of the accompanying drawing where a layer 1 of the composite is shown laid over a substrate 2 such as asphalt and bonded thereto with a layer 3 of a suitable adhesive. In that embodiment, the top surface of the composite is exposed and though this type of surfacing will be useful for many applications, such as a playground, it is within the scope of this invention to apply one or more different layers of material on top of the composite for special purposes to form a laminated structure. For example, as shown in FIG. 2, the top surface of the layer 1 of the composite is covered with a layer 4 of conventional polyurethane which can be formed in situ or bonded thereto with a layer 6 of suitable adhesive. The top layer 4 can have rubbery aggregate, such as polyurethane aggregate, distributed over it in a random manner, or embedded therein to provide a relatively rough surface with greater traction on the exposed surface of the assembly. This embodiment of FIG. 2 will be particularly useful as an athletic running track.

Figure 3:
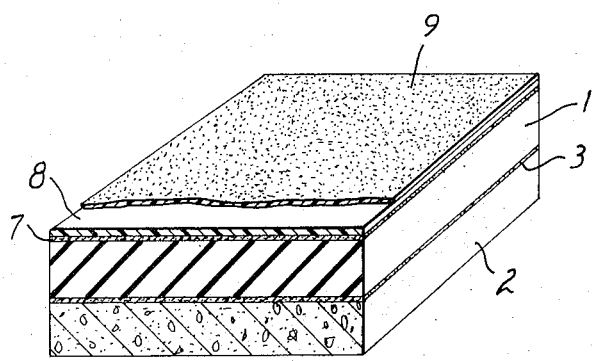

FIG. 3 illustrates another embodiment of this invention where the composite material of this invention is used in a laminated structure useful as a surfacing for a tennis court or the like. In this embodiment, the top surface of the layer 1 of composite is covered with a suitable sealcoat 7 on which is applied a relatively thicker leveling or seam-hiding coat 8 of a suitable resilient material such as polyurethane and the latter then covered with a topcoat 9. Said topcoat 9 can be a polyurethane containing polyvinyl chloride aggregate to provide a non-slip surfacing.

Figure 4:
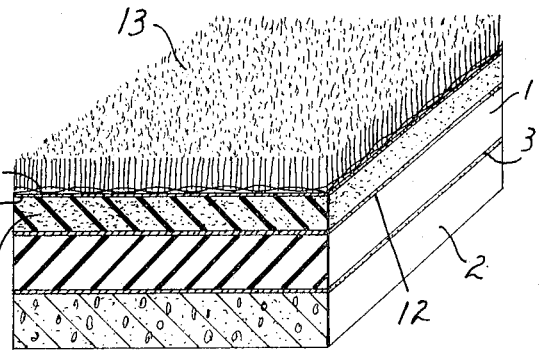
Figure 5:
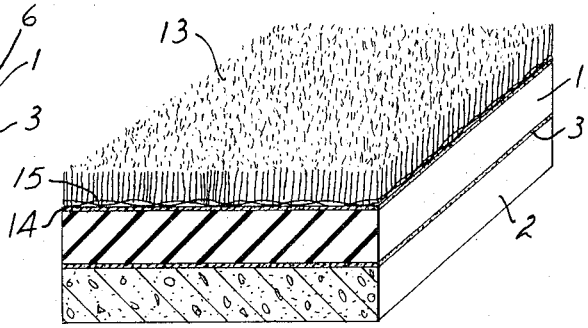

The composite of this invention can also be used in fabricating artificial turf, embodiments of which are shown in FIGS. 4 and 5. Referring to FIG. 4, the top of the composite layer 1 is covered with a layer 11 of a suitable foamed plastic, such as flexible polyurethane foam, polyvinyl chloride foam, nylon foam or polyolefin foam, adhesively bonded to the composite layer 1 with a suitable adhesive 12. The layer 11 of foamed plastic is then covered with a layer of pile fabric 13 which can be adhesively bonded thereto with a layer 14 of a suitable adhesive. The fabric 13 can be of a knitted or tufted type of fabric, the fibers, ribbons, or pile of which simulate that of natural grass. The projecting fibers can be formed from durable, weather resistant plastics, such as nylon, polypropylene, or polyesters. The fibers can be crimped to provide resilience and matting resistance. The fibers can be pigmented to provide any desired color, but green is usually preferred to simulate grass. The pigments used should be color-fast under weather exposure conditions. Ultraviolet light absorbers may also be added to the fibers as needed. In order to form a durable composite structure, the fabric backing, 15 which the fibers are attached to preferably should be capable of flexing with the substrate. The backing fabric can be a natural or synthetic fiber such as polyester, (e.g., polyethylene terephthalate) polypropylene, nylon, or the like, to which the grass-simulating fibers are secured, for example by looping. The backing can be made with some degree of permeability, for example to permit the adhesive 14 to penetrate the same and ensure anchoring of the pile fabric to the substrate. The backing can be perforated to provide for drainage of water.

The above-described method, in which the composite layer is poured onto the substrate and cured in situ, may be preferred for large athletic surfaces, for example football fields. In many applications, however, the artificial turf can be prepared by in-plant fabrication. Such artificial turf can later be applied to the rigid substrate by casting a relatively thin layer of adhesive, preferably a 100 percent solids urethane reaction mixture. This alternative procedure is particularly advantageous when the surfacing is applied to relatively small areas, for example golf greens or tee areas, patios, or the like.

Various other materials can be laminated on the novel composite material of this invention, using the composite as a substrate. For example, tiles of polyvinylchloride or polyvinyl-chloride-asbestos can be adhesively bonded to the composite and the laminated assembly used for flooring. Also, the composite can be flooded with water and the latter frozen to form an ice-skating surface, the composite used as a substrate for this purpose preferably being water-permeable so as to anchor the layer of ice formed on top of the composite layer, the latter, if desired, being coated on its bottom with a seal coat, for example, made of polyurethane, to prevent drainage of the water therethrough. Though the composite of this invention has been described herein with particular reference to its use as or in surfacing, it can be used for other purposes, such as a crack or seam filler for construction materials, such as concrete and wood, or it can be shaped in the form of curvilinear articles and used, for example, for drainage or irrigation purposes.

Further objects and advantages of this invention will be illustrated in the following examples, though the particular materials and amounts thereof recited in these examples, as well as other details, should not be construed to unduly limit this invention.

Example 1

A composite of this invention is made based on the following formulation:

Table I

| | Parts by weight |
|---|---|
| Vulcanized rubber particles | 400 |
| Polypropylene ether glycol (2000 mol weight) | 50 |
| Polypropylene ether triol (1500 mol weight) | 15 |
| Xanthate catalyst | 3 |
| Polymethylene polyphenyl polyisocyanate (Mondur MRS) | 32 |

The particulate vulcanized rubber of Table I is obtained by abrading or shredding used automobile and truck tire tread and is a blend of vulcanized natural rubber and SBR rubber having the following size distribution.

Table II

| Fraction, particle size | Wt. % |
|---|---|
| Retained on screen with ½" openings | 2.2 |
| Retained on screen with ¼" openings | 3.8 |
| Retained on U.S. Sieve No. 4 | 1.6 |
| Retained on U.S. Sieve No. 8 | 10.8 |
| Retained on U.S. Sieve No. 12 | 20.8 |
| Retained on U.S. Sieve No. 20 | 41.8 |
| Retained on U.S. Sieve No. 30 | 9.3 |
| Through U.S. Sieve 30 | 9.7 |

The xanthate catalyst of Table I is prepared by adding 44 parts by weight of particulate sodium metal to 1,000 parts by weight of dipropylene glycol, stirring and heating the mixture to melt the sodium while removing the evolved hydrogen gas. The resulting dipropylene glycol solution of the sodium salt of dipropylene glycol is cooled to 20° C. and 145 parts of carbon disulfide is added thereto to produce a dipropylene glycol solution of the sodium salt of mono-xanthate of dipropylene glycol,

In preparing the composite, following the formulation of Table I, the glycol, triol, catalyst, and polyisocyanate are mixed in a suitable container to provide a homogeneous solution, the NCO/OH equivalent ratio of the solution being about 2/1. The vulcanized rubber particles are added to this solution and the blend mixed until all of the particles are uniformly wetted or coated with the solution. The mass of coated particles is then poured into a flat rectangular mold, 1 foot × 2 feet × 8 inches, and 75 lbs./ft² pressure is applied to the top of the mass of coated particles while the coating cures. The resulting cured, permeable composite, having a density of about 0.7 g/cc. and a free void space content of about 40 vol. percent, is then sliced to provide 1/4 inch thick slabs of composite. Samples of the composite are tested for physical properties and these are summarized in Table III.

Table III

| | | |
|---|---|---|
| Tensile strength (ASTM D-412) | 75.7 | psi |
| Elongation (ASTM D-412) | 32.5 | % |
| Tear strength (ASTM D-624, Die C) | 22.7 | psi |
| Compression modulus (ASTM D-575) | | |
| at 10% compression | 15 | psi |
| at 50% compression | 350 | psi |
| Impact resilience (ASTM D-2632) | 28 | |
| Hydrolytic stability* | 31 | days** |

*This property is measured by subjecting the sample to an environment of 100°C. and 95% relative humidity, according to the test described in Insulation, August, 1968, p. 39.
**After subjecting sample to the 100°C., 95% RH environment, no apparent change in the sample is noted, indicating structural integrity is maintained.

Example 2

A 1/4 inch thick layer of the composite as described in Example 1 is bonded to an asphalt substrate with a conventional two-part polyurethane adhesive to provide a supported surfacing such as depicted in FIG. 1, useful as a resilient surfacing or pavement for pedestrian or vehicular traffic or for athletic activities. The polyurethane adhesive used as a room-temperature curable adhesive has the following formulation:

Table IV

| Part A | |
|---|---|
| | Parts by wt. |
| Polypropylene glycol (2000 mol weight) | 50.33 |
| Litharge catalyst | 0.20 |
| Pigment millbase (a mixture of green and yellow pigments and carbon black in polypropylene glycol, 2000 mol weight) | 1.90 |
| Calcium octoate wetting agent | 0.40 |
| Clay filler | 46.00 |
| Ethyl Cellosolve hardness modifier | 0.80 |
| Asbestos fiber thickener | 0.25 |
| Phenylmercuric acetate catalyst | 0.12 |
| Part B | |
| Polymethylene polyphenyl polyisocyanate (Mondur MRS) | 9.0 |

Example 3

An athletic running track is prepared by applying to the top of the supported surfacing prepared as described in Example 2 a 1/8 inch thick layer of the polyurethane formulation shown in Table IV, using a 3/16 inch notched trowel to apply the formulation to the top of the composite layer. Before the coating of the polyurethane formulation is allowed to cure at ambient conditions, it is sprinkled with cured polyurethane particles having a size range such that the particles used pass through a screen with 3/16 inch openings. The resulting laminate construction, similar to that depicted in FIG. 2, is useful as an athletic running track.

Esample 4

A surfacing useful as a tennis playing surface is made by applying, first of all, to the top of the supported surfacing structure described in Example 2, a seal coat of the polyurethane formulation shown in Table IV (but containing about 3 wt. percent asbestos fibers), this sealcoat being applied with a flat trowel to the top of the composite layer and in an amount sufficient to provide 45 grams/ft². After this sealcoat is allowed to cure to a tack-free condition at ambient temperatures, another polyurethane formulation is applied with a notched trowel on top of the sealcoat in an amount sufficient to provide 100 grams/ft² of a level coat. This level coat is allowed to cure at ambient temperature and is made from the following formulation:

Table V

| Part A | |
|---|---|
| | Parts by wt. |
| Polypropylene glycol (PPG-2025, 2000 mol weight) | 52.40 |
| Polypropylene glycol (PPG 425, 425 mol weight) | 4.50 |
| Litharge | 0.20 |
| Calcium octoate | 0.60 |
| Clay | 47.00 |
| Phenyl mercuric acetate | 0.10 |
| Part B | |
| Polymethylene polyphenyl polyisocyanate (Mondur MRS) | 10.60 |

In order to provide a non-slip surface, a 4–7 mil thick conventional moisture-cured polyurethane resin, containing polyvinyl chloride aggregate, is then applied as a topcoat.

Example 5

Other surfacing made in accordance with this invention, useful as a tennis playing surface or for other athletic purposes, can be prepared in accordance with Example 4 by omitting the level coat and applying the non-slip surfacing directly onto the seal coat. Alternatively, the seal coat and level coat can both be omitted and the non-slip surfacing applied directly to the top of the composite layer. Further, the level coat can be omitted and the non-slip surfacing can be applied to the seal coat, preferably after first sanding the seal coat to provide a smooth surface. A still further modification can be prepared like that described in Example 4 except that the level coat formulation can include polyvinylchloride aggregate and the non-slip surfacing can be omitted. A still further modification can be made by following Example 4 but instead of using the non-slip surfacing, a conventional moisture-cured polyurethane formulation, containing polyvinyl aggregate, can be used, for example with a thickness of 4 mils, such a surfacing having a matte finish, this structure being useful, for example, as an indoor playing field for general athletic purposes.

Example 6

A surfacing, which can be characterized as an artificial turf useful for athletic events such as football, is fabricated by applying a layer of adhesive, having the formulation set forth in Table II, to the exposed or top surface of the supported composite described in Example 2. Before the coating of the adhesive cures, there is applied to it a layer of preformed conventional flexible polyurethane foam, having a high energy absorbing capacity and a density, for example, of 10 lb./ft³. Then another layer of said adhesive is applied to the exposed top of the polyurethane foam and before it cures a pile fabric is place on it and pressed into place so that the adhesive wets the backing of the pile fabric and a portion of the adhesive penetrates the backing into contact with the pile fibers, thus providing a secure, tenacious bond upon completion of the curing of the adhesive. The pile fabric is a cut, crimped nylon pile, 1/2 inch in height, placed onto a knitted polyester backing having a total weight of about 2.2 lbs./yd$^2$. The individual nylon fibers are 2 inches long, circular in cross-section, heat-set crimped with about 8 crimps/in. so that their length after crimping is about 1 inch, the fiber being weather resistant and about 60 denier. The backing is made from 440 denier polyethylene terephthalate yarn which is circularly knitted to include pile fiber in the stitches. The nylon fibers are looped around the backing yarn with each end forming part of the pile. The pile fabric is lightly coated on the back side with an acrylic latex to improve the dimensional stability and handling of the fabric. The coating is light enough to just coat the yarn of the backing without closing off the spaces between the yarn.

The resulting surfacing or artificial turf is like that depicted in FIG. 4. As a modification thereof, the polyurethane foam layer can be omitted and the pile fabric directly adhesively bonded with said polyurethane adhesive to the exposed top surface of the composite, to provide an artificial turf like that depicted in FIG. 5.

Various modifications and alterations of this invention will become apparent to those skilled in the art without departing from the scope and spirit of this invention, and it should be understood that this invention is not to be unduly limited to the illustrative embodiment set forth herein.

What is claimed is:

1. A flexible, resilient, elastomeric, water permeable composite comprising 50 to 95 weight percent vulcanized rubber particles partially or wholly coated and bonded with 5 to 50 weight percent crosslinked binder having a plurality of isocyanurate and urethane linkages and derived from an essentially solvent-free, polyisocyanate-polyoxyalkylene polyol reaction mixture having an NCO/OH equivalent ratio of 2/1 to 12/1, about 20 to 85 percent of the isocyanate groups in said reaction mixture being converted to said isocyanurate linkages which impart thermal stability and hydrolytic stability to said binder, said polyol having a hydroxyl equivalent weight of 400 to 1,000, which reaction mixture is cured in admixture with said rubber particles, said composite having 15 to 75 volume percent void space.

2. The composite of claim 1 wherein said NCO/OH equivalent ratio is 2/1.

3. A surfacing comprising a layer of the composite of claim 1.

4. The surfacing of claim 3 further comprising one or more laminae of polymeric material overlying said layer of composite.

5. The surfacing of claim 4 wherein the uppermost lamina has non-slip characteristics.

6. The surfacing of claim 4 wherein the uppermost lamina has rubbery aggregate embedded therein to provide traction.

7. The surfacing of claim 3 wherein the uppermost lamina comprises a layer of pile fabric.

8. The surfacing of claim 7 wherein a layer of energy-absorbing material is interposed between said layer of composite and said layer of pile fabric.

9. The surfacing of claim 8 wherein said energy absorbing material comprises foamed plastic.

10. The composite according to claim 1 wherein said binder is formed by heating in the presence of said particles a mixture comprising polymethylene polyphenylene polyisocyanate and polypropylene ether in the presence of polyether polyol solution of monosodium dipropylene glycol xanthate.

11. The composite according to claim 1 wherein said vulcanized rubber particles are those obtained by abrading or shredding pneumatic tires made of natural rubber and SBR.

12. A method of making a flexible, resilient, elastomeric, water permeable composite having 15 to 75 volume percent void space, comprising partially or wholly coating vulcanized rubber particles with an essentially solvent-free, liquid reaction mixture comprising polyisocyanate, polyoxyalkylene polyol having a hydroxyl equivalent weight of 400 to 1,000, and trimerizing catalyst, said reaction mixture having an NCO/OH equivalent ratio of 2/1 to 12/1, shaping the resulting mass of coated particles, and curing said reaction mixture to form a crosslinked binder to bond said vulcanized rubber particles, said binder having a plurality of isocyanurate and urethane linkages, about 20 to 85 percent of the isocyanate groups in said reaction mixture being converted to said isocyanurate linkages which impart thermal stability and hydrolytic stability to said binder, the amount of said vulcanized rubber particles being 50 to 95 weight percent and the amount of said binder being 5 to 50 weight percent, said amounts being based on the total weight of said composite.

13. The method according to claim 12, wherein said polyisocyanate comprises polymethylene polyphenyl polyisocyanate, said polyol comprises polypropylene ether glycol, and said catalyst comprises a xanthate salt, said reaction mixture having an NCO/OH equivalent ratio of 2/1 to 6/1.

14. The method according to claim 13 wherein said xanthate salt is mono-sodium dipropylene glycol xanthate.

* * * * *